(12) United States Patent
Matsuno et al.

(10) Patent No.: US 7,552,948 B2
(45) Date of Patent: Jun. 30, 2009

(54) QUICK CONNECTOR

(75) Inventors: Keiji Matsuno, Komaki (JP); Atsuo Miyajima, Inuyama (JP)

(73) Assignee: Tokai Rubber Industries, Ltd. (JP)

( * ) Notice: Subject to any disclaimer, the term of this patent is extended or adjusted under 35 U.S.C. 154(b) by 107 days.

(21) Appl. No.: 11/679,963

(22) Filed: Feb. 28, 2007

(65) Prior Publication Data

US 2007/0228727 A1 Oct. 4, 2007

(30) Foreign Application Priority Data

| Sep. 29, 2006 | (JP) | ............................. 2006-092572 |
| Jan. 30, 2007 | (JP) | ............................. 2007-020034 |
| Jan. 30, 2007 | (JP) | ............................. 2007-020035 |

(51) Int. Cl.
    *F16L 37/00* (2006.01)
(52) U.S. Cl. ........................... 285/313; 285/308; 285/83
(58) Field of Classification Search ................ 285/308, 285/312, 313, 307, 319, 83
    See application file for complete search history.

(56) References Cited

U.S. PATENT DOCUMENTS

| 5,568,946 | A | * | 10/1996 | Jackowski | .................. 285/308 |
| 5,586,791 | A | * | 12/1996 | Kirchner et al. | ............. 285/319 |
| 5,897,142 | A | * | 4/1999 | Kulevsky | ..................... 285/308 |
| 5,947,531 | A | * | 9/1999 | Eckard et al. | ................ 285/319 |
| 6,318,764 | B1 | * | 11/2001 | Trede et al. | .................. 285/305 |
| 6,517,120 | B1 | * | 2/2003 | Miyajima et al. | ........... 385/305 |
| 6,688,654 | B2 | * | 2/2004 | Romero | ...................... 285/308 |
| 7,014,221 | B2 | * | 3/2006 | Iwasaki et al. | ............... 285/319 |
| 7,284,774 | B2 | * | 10/2007 | Bauer et al. | .................. 285/319 |
| 7,302,818 | B2 | * | 12/2007 | Usuzaki et al. | ............. 285/319 |
| 7,328,922 | B2 | * | 2/2008 | Takayanagi et al. | ......... 285/308 |

FOREIGN PATENT DOCUMENTS

| JP | 10-255662 | 7/1999 |
| JP | 2004-099619 | 10/2005 |

* cited by examiner

*Primary Examiner*—David E Bochna
(74) *Attorney, Agent, or Firm*—Andrus, Sceales, Starke & Sawall, LLP (57) ABSTRACT

Retainer assembly has a pair of retainers that are disposed on diametrically opposite sides of a passage way of an annular engaging projection of a pipe, and release arms that are provided on the retainers, respectively. Each of the retainers has a fixing end portion integrally connected to and supported by a pipe retainer portion, and a free end including an engaging portion for snap-engaging with the annular engaging projection. Each of the release arms has a cross-sectional shape for allowing a pressure on the release arm in a longitudinal direction, when being pressed radially inwardly from outside.

14 Claims, 12 Drawing Sheets

QUICK CONNECTOR

BACKGROUND OF THE INVENTION

1. Field of the Invention

The present invention relates to a quick connector, for example, to be adapted for assembly in piping of an engine cooling system or a gasoline fuel system in a motor vehicle.

2. Description of the Related Art

In a piping of a coolant system or gasoline fuel system in a motor vehicle, a quick connector is used for connecting a pipe and a mating member such as a rubber hose or a resin tube. Such quick connector is configured to snap-engage with the pipe, and, for example, has a tube connecting portion on one longitudinal or axial end thereof. A rubber hose or a resin tube is fitted on the tube connecting portion, and an insertion end portion of the pipe is relatively inserted in the quick connector through an opening of the other longitudinal or axial end of the quick connector until the pipe is snap-engaged with the quick connector. Thereby the quick connector and the pipe are connected each other with simple operation.

A known type of a quick connector for snap-engaging with the pipe has a connector housing that is provided with a tube connecting portion on one longitudinal end thereof and a pipe retainer portion on the other longitudinal end thereof, and a retainer for snap-engaging with the insertion end portion of the pipe that is fitted in the pipe retainer portion (for example, refer to Patent Document 1). Here, the retainer has a cylindrical shape with C-shaped cross-section, and is provided integrally with a pair of release arms on the other longitudinal end thereof. Such retainer is fitted in the pipe retainer portion through an opening of the other longitudinal end of the connector housing so as to engage with the pipe retainer portion in locked relation, and engage operating end portions of the release arms with the other longitudinal end of the pipe retainer portion.

The pipe that has been inserted in and connected to the quick connector can be relatively pulled out of the quick connector in the following manner. The retainer and the pipe retainer portion are disengaged by pressing the operating end portions of the pair of the release arms radially inwardly from outside to narrow a distance between the release arms, and the retainer is relatively pulled out of the pipe retainer portion. However, there is a problem when such type of the quick connector is connected to a pipe with short length, namely the pipe that extends or protrudes short from an equipment. In this case, since a distance between the connector housing of the quick connector and a main member of the pipe or the equipment is short, it is difficult to manipulate the operating end portions of release arms that are located between the connector housing and the main member of the pipe, resulting that an worker is bothered to separate the quick connector from the pipe.

So, for example, as disclosed in Patent Document 2, another type of a quick connector is used. In this type of the quick connector, a pipe retainer portion is formed with retainer locating slits (axial gaps) extending circumferentially for receiving retainers therein and the retainers are disposed in the retainer locating slits for preventing release portions of the retainers from being located axially outward of the connector housing.

[Patent Document 1] JP-A, 11-201355
[Patent Document 2] JP-A, 2005-282762

However, in the quick connector as disclosed in Patent Document 2, a slim and long retainer is easily deformed. So, when a high internal fluid pressure is exerted between the pipe and the connector housing, and the retainer is pushed strongly by an annular engaging projection of the pipe in the other longitudinal direction, the retainer is tilted radially outward in the other longitudinal direction, resulting in a fear that the annular engaging projection of the pipe is disengaged from the retainer, and the pipe is accidentally relatively removed from the connector housing.

In order to cope with such problem, a retainer may be configured to engage with a pipe retainer portion of the connector housing radially outward when the retainer is pushed by the annular engaging projection of the pipe and deformed in the other longitudinal direction. However, in this configuration, the release arms should be manipulated for separating the pipe from the quick connector carefully not to deform the retainer in the other longitudinal direction. This also bothers the worker to separate the quick connector from the pipe.

Under the circumstances, it is an object of the present invention to provide a quick connector that provides an excellent lock and allows a worker easy separation from the pipe.

SUMMARY OF THE INVENTION

In order to achieve a foregoing object, there is provided a novel quick connector in accordance with the present invention. The quick connector comprises a tubular connector housing that is provided with a tube connecting portion (a portion to be connected to a resin tube or a rubber hose) on one longitudinal end thereof and a pipe retainer portion on the other longitudinal end thereof, and retainer means that is arranged in the pipe retainer portion. The retainer means snap-engages with an annular engaging projection that is formed on an insertion end portion of a pipe that is inserted in the connector housing and thereby locks the pipe with respect to the connector housing. The retainer means has a pair of retainers that are disposed diametrically opposite sides of a passage way of the annular engaging projection, and release arms that are provided on the retainers, respectively. Each of the retainers has a fixing end portion integrally connected to and supported by the pipe retainer portion, and a free end (a free end portion or a portion including a free end portion) including an engaging portion for snap-engaging with the annular engaging projection. The retainers are resiliently deformable in such manner that the free ends (free end portions or portions including free end portions) spread out or spread apart taking the fixing end portions as fulcrums or with the fixing end portions as center of rotation by pressing the pair of release arms radially inwardly from outside or from radially outside. The free ends (free end portions or portions including free end portions) of the retainers engage with the pipe retainer portion of the connector housing radially outwardly, when being deformed in the other longitudinal direction (in the other axial direction, or in a direction opposite to a pipe insertion direction). Each of the release arms has a cross-sectional shape for allowing a pressure on the release arm (for example, a leading end portion or outer end portion of the release arm) in the other longitudinal direction (in the other axial direction or in the direction opposite to the pipe insertion direction), when being pressed radially inwardly from outside. When the insertion end portion of the pipe is relatively inserted in the pipe retainer portion (pipe holding portion) of the connector housing, the annular engaging projection formed on the insertion end portion is snap-engaged with the retainer, and the pipe is connected to the connector housing in locked relation. When a great separating force is exerted to the pipe and the connector housing due to some reason such as high internal fluid pressure, and thereby the retainers are deformed in the other longitudinal direction (the other axial direction) by being pushed by the annular engaging projection, the retainer engages with the pipe retainer portion of the connector housing radially outwardly, namely, the retainer engages with the pipe retainer portion so as not to be deformed radially outwardly. Therefore, the retainer is effectively prevented from spreading apart so as to allow passage of the annular engaging projection therethrough. And, each of the release arms has such cross-sectional shape that a pressure acts on the release arm in the other axial direction when the release arms are pressed radially inwardly from outside. So, when the release arms are pressed from outside, the release arms tend to be deformed in the other axial direction. When each of the release arms is deformed in the other axial direction, the retainer is deformed in one axial direction taking the fixing end portion as a fulcrum. In this manner, since the retainer is not prevented from spreading and being deformed, the pipe is separated from the connector housing smoothly.

The release arm may have such cross-sectional shape or sectional-shape that radially outer surface extends in one axial direction at an angle toward a radially inward direction. In this manner, since a component of pressure acts on the radially outer surface in the other axial direction when the release arm is pressed, the release arm is easily deformed in the other axial direction. Or, the release arm may also have such sectional shape that one axial end surface extends in a radially outward direction at an angle toward the other axial direction.

The pipe retainer portion of the connector housing may be formed with retainer locating slits extending in a circumferential direction, and the retainers are disposed in the retainer locating slits, respectively. Thereby sufficient deformation of the retainer can be secured with a simple configuration.

By the way, when vibration of an engine or a motor vehicle body is transmitted to the quick connector via the pipe and the quick connector quivers or vibrates tremulously with respect to the pipe, an annular sealing member that is disposed in the quick connector is rubbed with the pipe and worn, as a result, it is feared that sealing performance of the quick connector is lowered at an early stage. In order to deal with such problem, preferably, anti-rotation mechanism as well as locking mechanism is constructed between the pipe and the quick connector. It is an object of one aspect of the present invention to provide a quick connector that has also an excellent anti-rotation mechanism or function with respect to the pipe, and according to one aspect of the present invention, there is provided a novel quick connector that secures also an anti-rotation lock with respect to the pipe. In order to construct a simple anti-rotation mechanism between a quick connector and a pipe, it is effective to form a recessed portion in an entrance hole (an opening portion or an entrance portion of the other longitudinal end of the pipe retainer portion or the connector housing) of a pipe entrance portion (the other longitudinal end of the pipe retainer portion or the connector housing) of the pipe retainer portion. The recessed portion is used for providing an anti-rotation lock with respect to the pipe. Specifically, an anti-rotation stay (anti-rotation stay projecting radially outwardly) is provided on an insertion end portion of the pipe (on an outer periphery of the insertion end portion), and the anti-rotation stay is inserted the recessed portion (the recessed portion receives the anti-rotation stay therein) at insertion of the pipe into the connector housing, and the recessed portion engages with the anti-rotation stay non-rotationally. In this construction, the pipe is connected to the quick connector and the anti-rotating mechanism is constructed between the pipe and the quick connector by relatively inserting the pipe in the quick connector straightforwardly while conforming the anti-rotation stay of the pipe to the recessed portion in a circumferential position.

An annular sealing member for providing a seal between the pipe and the connector housing should be disposed in the connector housing, on one axial end with respect to the retainer. However, when the retainers are provided integrally on the pipe retainer portion, the retainers will be a obstacle to insertion of the sealing means, and the sealing means cannot be mounted easily. In order to cope with this problem, the connector housing is constructed by fitting together a tube-end composing member having a tube connecting portion and a retainer-end composing member having a pipe retainer portion. In this construction, the sealing member can be easily disposed in the connector housing when the tube-end composing member and the retainer-end composing member are fitted together. The retainer-end composing member and the tube-end composing member are fitted together in a following manner. Either one of the tube-end composing member and the retainer-end composing member (for example, the retainer-end composing member) is formed with a fit portion, and the other of the tube-end composing member and the retainer-end composing member (for example, the tube-end composing member) is formed with a plug-in portion (for example, an longitudinal end portion or the other longitudinal end portion). The fit portion has a plurality of fixing segments arranged circumferentially and formed with engaging holes, respectively, while the plug-in portion has engaging detents on an outer periphery thereof. The plug-in portion is inserted inside or under the fixing segments of the fit portion in such manner that the engaging detents engage with the engaging holes whereby the tube-end composing member and the retainer-end composing member are fit together to construct the connector housing.

Due to engagement between the engaging detents and the engaging holes, the retainer-end composing member and the tube-end composing member are fixed to each other in a circumferential direction as well as in a longitudinal direction. Rotational movement of the retainer-end composing member and the tube-end composing member relative to each other is prevented by the circumferentially fixed relation therebetween. When accuracy of the anti-rotation lock therebetween is enhanced, for example, in order to prevent abrasion of the sealing member, or the sealing member to be disposed in the tube-end composing member, or in order to eliminate backlash between the retainer-end composing member and the tube-end composing member, a circumferential length of the engaging detent has to conform to that of the engaging hole. However, although the engaging detent and the engaging hole are intended to be dimensioned equally in circumferential length, in some case, the engaging detent could be longer than the engaging hole in circumferential length due to dimension error. When the engaging detent is longer than the engaging hole in circumferential length, the engaging detent is not fitted in the engaging hole, and it is not possible to form surely fixedly locking relation between the retainer-end composing member and the tube-end composing member. There is no choice but to accept that the engaging detent is fitted in the engaging hole with certain play and a anti-rotation function is impaired. In order to prevent such inconvenience, it is effective to provide a pair of anti-rotation projecting portions on an outer periphery of the plug in portion. The pair of the anti-rotation projecting portions are spaced apart by a distance equal to or generally equal to a width of the fixing segment. And, the fixing segment is inserted and positioned between the pair of the anti-rotation projecting portions without or generally without creating a space circumferentially when the plug-in portion is inserted in the fit portion. Even when the distance between the pair of the anti-rotation projecting portions is shorter than the width of the fixing segment due to dimension error, the plug-in portion can be inserted in the fit portion by force-fitting the fixing segment between the pair of the anti-rotation projecting portions. The fit portion may have an inner cylindrical portion radially inside the fixing segments. In this configuration, the plug-in portion is inserted between the fixing segments and the inner cylindrical portion of the fit portion.

The pair of the anti-rotation projecting portions may be provided for exactly one of the fixing segments. When pairs of the anti-rotation projecting portions are provided for a plurality of the fixing segments, it is feared that resistance to insertion of fixing segments between the anti-rotation projecting portions is increased too much. In such configuration, cavities for anti-rotation projecting portions are formed in only one of molds for the tube-end composing member or the retainer-end composing member, and therefore, dimension accuracy of the anti-rotation mechanism is improved.

The fixing segment for constructing the anti-rotation mechanism may have a shape tapered toward a leading end thereof on a leading end portion thereof. In this configuration, the fixing segment can be smoothly inserted and positioned between the pair of the anti-rotation projecting portions.

A quick connector according to the present invention is positively connectable to a pipe in locking relation, readily disconnectable from the pipe, and, for example, certainly performs anti-rotation function with respect to the pipe.

Now, the preferred embodiments of the present invention will be described in detail with reference to the drawings.

DETAILED DESCRIPTION OF THE PREFERRED EMBODIMENTS

With reference to FIGS. 1 to 4, a configuration of a quick connector 1 according to the present invention will be explained.

Figure 1:
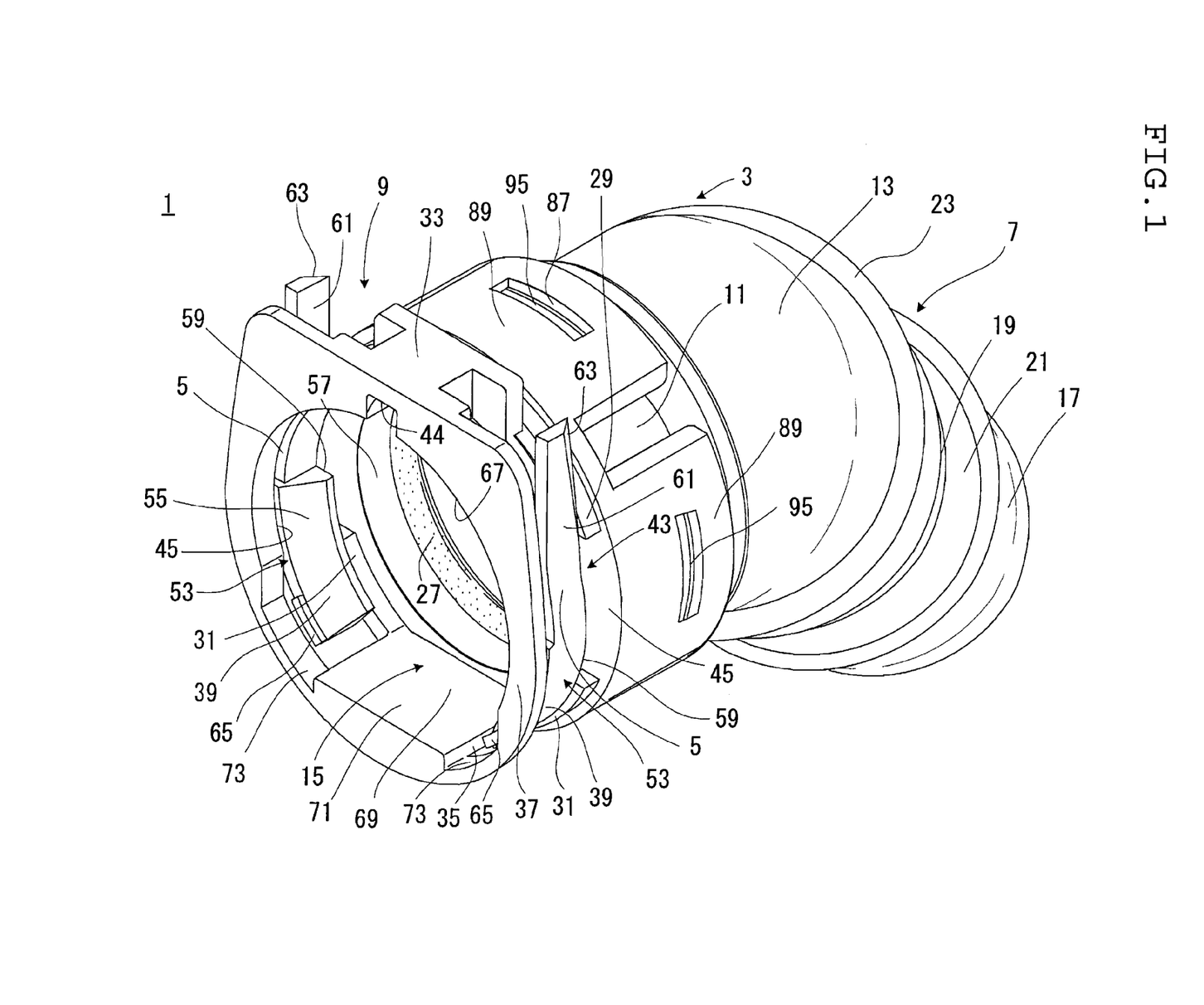
FIG. 1 is a perspective view of a quick connector according to the present invention.
Figure 2:
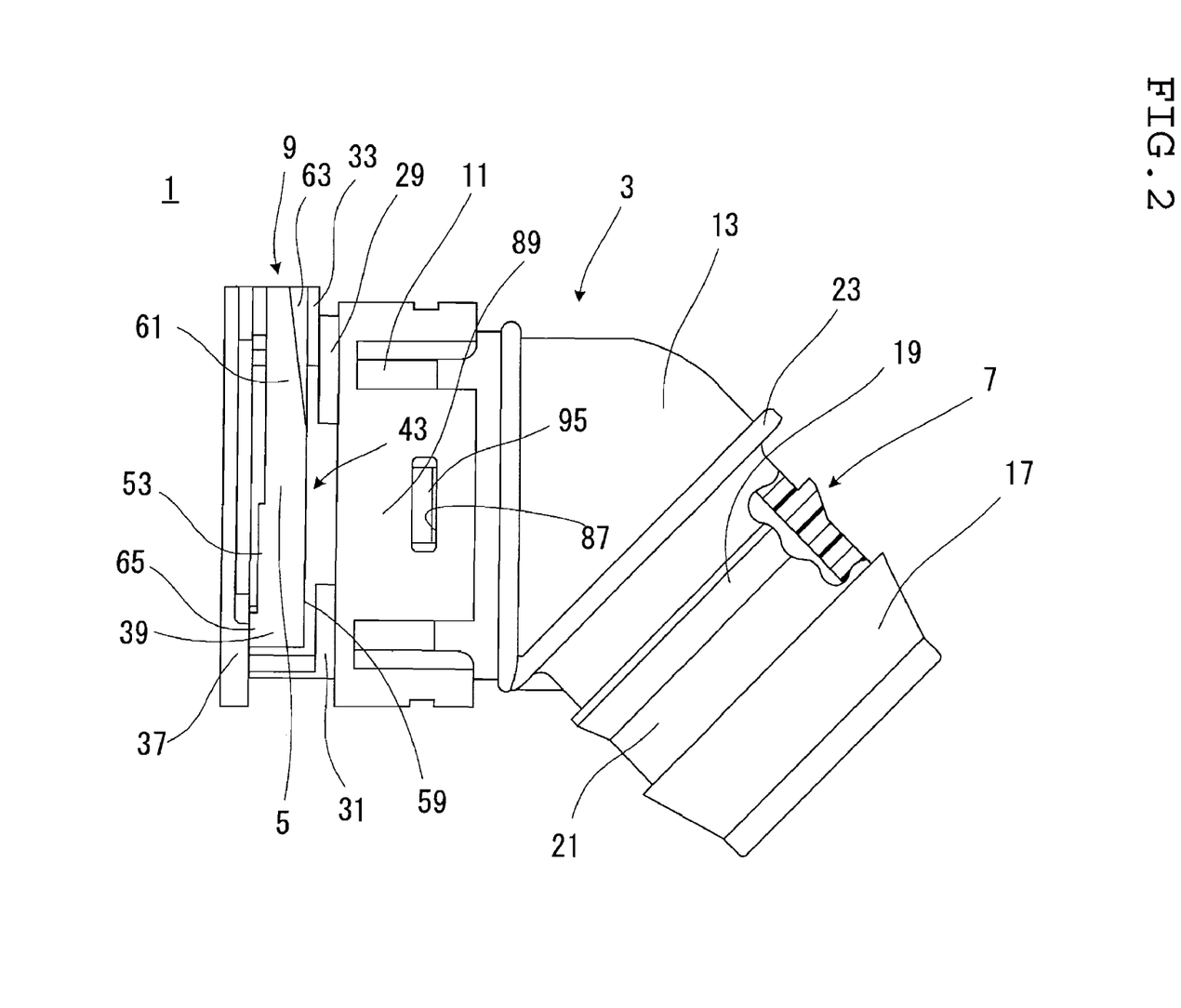
FIG. 2 is a front plan view of the quick connector of FIG. 1.
Figure 3:
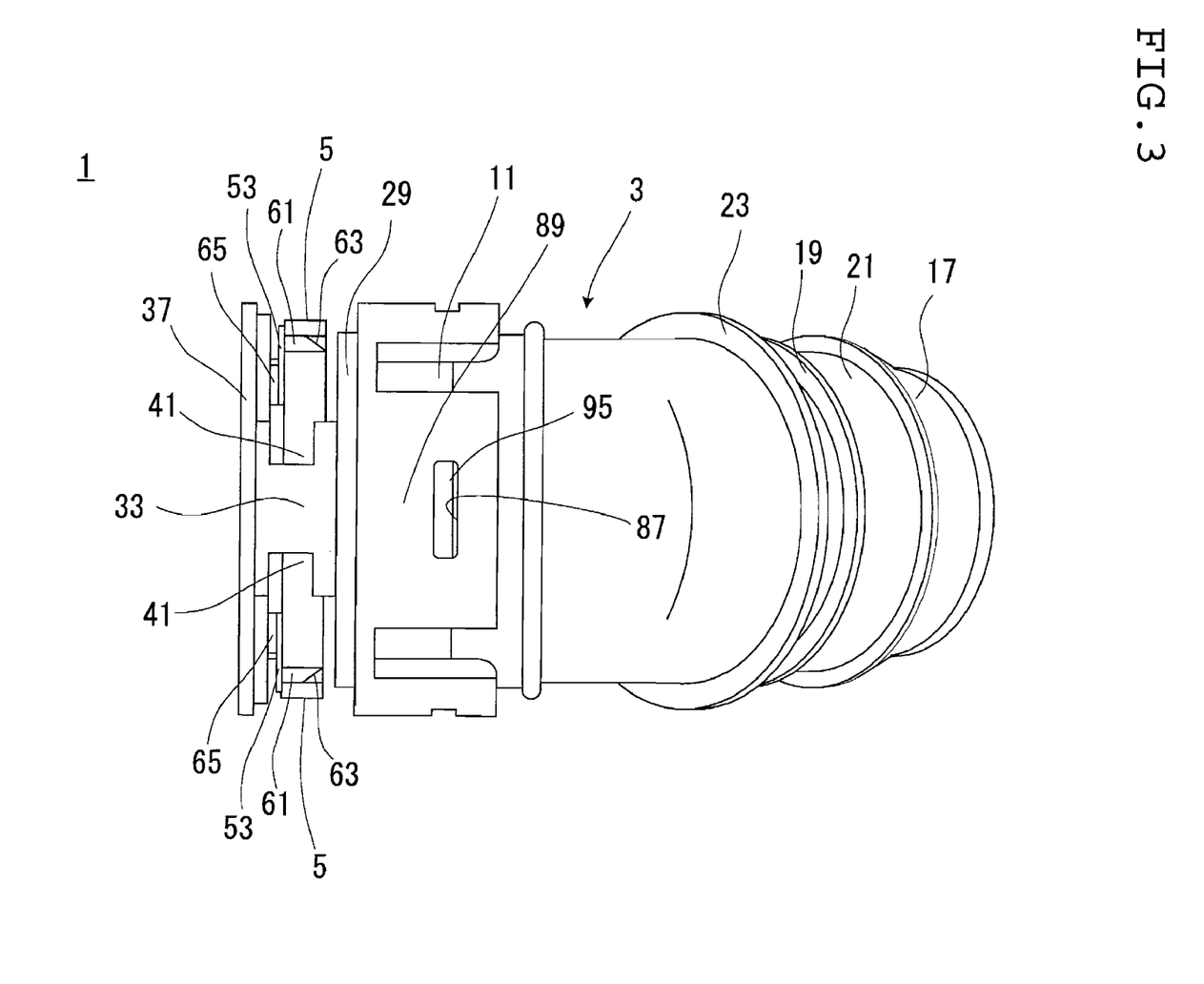
FIG. 3 is a plan view of the quick connector of FIG. 1.
Figure 4:
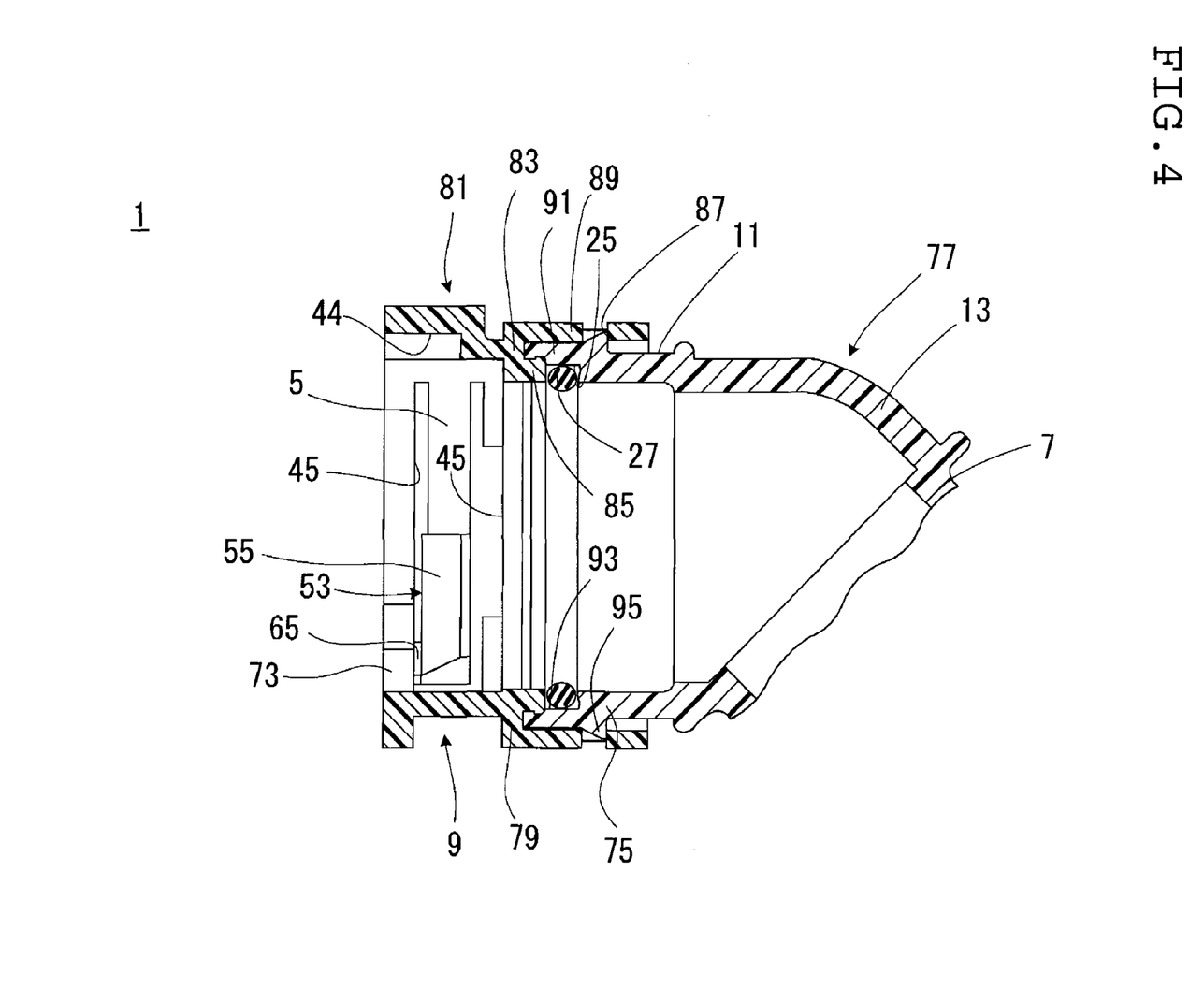
FIG. 4 is a sectional view of the quick connector of FIG. 1.

The quick connector 1 of FIG. 1 is adapted for connection in piping for engine coolant system or gasoline fuel system for a motor vehicle. The quick connector 1 comprises a tubular connector housing 3 and a pair of retainers 5, 5. The connector housing 3 and the retainer 5 are formed from glass-fiber reinforced polyamide (PA/GF) and integral with each other. The connector housing 3 has a cylindrical resin tube connecting portion or tube connecting portion (herein after referred to as tube connecting portion) 7 on one longitudinal end (one end along a longitudinal direction, one axial end), and a pipe retainer portion 9 on the other longitudinal end (the other end along the longitudinal direction, the other axial end). The connector housing 3 further has a pipe support portion 11 and a curved portion 13 between the tube connecting portion 7 and the pipe retainer portion 9, and a through-hole 15 that extends through from one longitudinal end (one end of the tube connecting portion 7) to the other longitudinal end (the other end of the pipe retainer portion 9). The tube connecting portion 7 is connected to the pipe support portion 11 via the curved portion 13, and angled about 45° with respect to the pipe retainer portion 9 and the pipe support portion 11. The tube connecting portion 7 comprises one axial end portion 17 and the other axial end portion 21. The one axial end portion 17 has an outer peripheral surface that includes a short cylindrical surface and a reverse-tapered surface extending from the short cylindrical surface and diametrically expanding at a gentle angle in the other longitudinal direction (a direction toward the other end of the tube connecting portion 7 along an axis thereof, the other axial direction). The other axial end portion 21 has an outer peripheral surface of a cylindrical outer surface on the other axial end with respect to the one axial end portion 17, and the cylindrical outer surface is provided with an annular stop projecting portion 19 that includes a right-triangle cross sectional portion diametrically expanding in the other axial direction and a short rectangular cross sectional portion on the other axial end with respect to the right-triangle cross sectional portion. A resin tube or a rubber hose is tightly fitted on an outer periphery or an outer peripheral surface of the tube connecting portion 7, and connected thereto. The other axial end portion 21 is provided with a stop flange 23 on the other axial end of an outer peripheral surface thereof. The stop flange 23 functions as a stopper for fitting the resin tube or the rubber hose on the tube connecting portion 7. The pipe support portion 11 has an annular groove 25 in an inner peripheral surface thereof, and an O-ring 27 is fitted in the annular groove 25.

The pipe retainer portion 9 is arranged on the other longitudinal end (the other axial end) of the connector housing 3 with respect to the pipe support portion 11. The pipe retainer portion 9 has a pair of arcuate projecting portions 29, 31 integrally on the other axial end surface of the pipe support portion 11, a thin-walled pipe entrance portion 37 connected integrally to the arcuate projecting portions 29, 31 via connecting portions 33, 35, respectively and a retainer body 43 in a form of a letter C and having a pair of arcuate retainers 5, 5 on widthwise opposite ends (diametrically opposite ends) thereof. The pair of arcuate projecting portions 29, 31 are diametrically spaced from each other, at diametrically symmetrical positions on the other axial end surface of the pipe support portion 11. The pipe entrance portion 37 is located on the other longitudinal end (the other axial end of the pipe retainer portion 9 along an axis thereof) with respect to the arcuate projecting portions 29, 31, axially spaced from the arcuate projecting portions 29, 31. The retainer body 43 has a fixing portion opposite to a position between free ends 39, 39 of the pair of retainers 5, 5, and the fixing portion of the retainer body 43 is connected integrally to the connecting portion 33. And, here, the fixing portion is divided or substantially divided by a recessed portion 44 (recess). Or, the retainer body 43 may comprise a pair of separate retainers 5, 5 of which fixing end portions 41, 41 are connected integrally to the connecting portion 33 (opposite ends of the connecting portion 33). The retainers 5, 5 are located in an axial space (a retainer locating slit extending in a circumferential direction) 45 between the pipe support portion 11 and the pipe entrance portion 37. The retainers 5, 5 are also located widthwise opposite ends or diametrically opposite ends of a course or passage way of an annular engaging projection 51 that is formed on a pipe 47 (refer to FIG. 5) or an insertion end portion 49 of the pipe 47 when the pipe 47 is inserted in the connector housing 3. Each of the pair of the arcuate projecting portions 29, 31 has an inner diameter equal to or generally equal to an outer diameter of the annular engaging projection 51 of the pipe 47.

An inner peripheral surface of the retainer body 43 has an inner diameter equal to or generally equal to the outer diameter of the annular engaging projection 51 of the pipe 47. However, each of the retainers 5, 5 of the retainer body 43 integrally has an engaging portion 53 on a portion of the retainer near and including its free end 39 (free end portion). An inner surface 55 of each engaging portion 53 is formed in such manner that a radius position or diametrical position (radius or radial distance from a center of the retainer body 43 or the retainer 5) on the other axial end thereof is equal to or generally equal to a radius position or diametrical position of an inner surface of the retainer 5 (a portion of the retainer 5 except for the portion near and including its free end 39), and a radius position or diametrical position of one axial end portion thereof is inwardly from a radius position or diametrical position of an inner surface of the retainer 5 and equal to or generally equal to a radius position or diametrical position of the through-hole 15 (pipe support hole 57 having an inner diameter equal to or generally equal to an outer diameter of a portion of the pipe 47 except for the annular engaging projection 51) of the pipe support portion 11. Therefore, the inner surface 55 of the engaging portion 53 is extending in one axial direction at an angle toward a radially inward direction and the engaging portion 53 has a generally right-triangle cross-section, and one axial end surface of the engaging portion 53 defines an engaging surface 59 that engages with the annular engaging projection 51.

Each retainer 5 integrally has a release arm 61 on a circumferential middle portion thereof. The release arms 61 are located at widthwise or diametrically symmetrical positions with respect to the connecting portion 33 or the fixing portion of the retainer body 43 with the connecting portion 33 or the fixing portion of the retainer body 43 therebetween, and extend and project from the retainers 5 parallel to a straight line connecting the connecting portions 33 and 35. The release arm 61 is formed with a generally rectangular cross-section at its root portion and with a trapezoidal cross-section on a portion toward its leading end with respect to its root portion or on a leading end with respect to its root portion. In the release arm 61, a portion of a radially outer surface or a radially outside surface near the pipe support portion 11 (one axial end portion of the radially outer surface or the radially outside surface) defines a slant surface 63 that extends toward the pipe support portion 11 (toward one axial end) at an angle toward a radially inward direction, or an end surface facing the pipe support portion 11 (an axial end surface) defines the slant surface 63 that extends in a radially outward direction at an angle toward the pipe entrance portion 37 (toward the other axial direction). The slant surface 63 is gradually widened from its root end toward its leading end.

Each of the retainers 5, 5 is entirely received in the retainer locating slit 45 so as to define slight axial gaps between the arcuate projecting portions 29, 31 and the retainer 5, and between the pipe entrance portion 37 and the retainer 5, respectively. The engaging portion 53 of each retainer 5 is provided with an anti-spreading protruding portion or a spreading preventing protruding portion 65 slightly protruding in the other axial direction, on its end portion near or facing the pipe entrance portion 37 (the other axial end portion thereof or the other axial end surface thereof) at a position of its free end 39. An axial position of a leading end (the other axial end) of the anti-spreading protruding portion 65 is equal or generally equal to an axial position of one axial end surface of the pipe entrance portion 37

The pipe entrance portion 37 has an entrance hole 67 that is equal or generally equal to an outer diameter of the annular engaging projection 51 of the pipe 47, but the entrance hole 67 is provided with a flat portion or flat surface portion 71 at a connecting region to the connecting portion 35. The flat portion 71 corresponds to the inner surface 69 of the connecting portion 35 (the flat portion 71 is flush with the inner surface 69). And, the entrance hole 67 is formed with receiving recessed portions 73, 73 in opposite ends of the flat portion 71 for receiving the anti-spreading protruding portions 65, 65. Meantime, a half of the pipe entrance portion 37 on a side of the connecting portion 35 has a semi-circular outer peripheral surface with an outer diameter equal to or generally equal to an outer diameter of the other axial end portion of the pipe support portion 11, and a half thereof on a side of the connecting portion 33 has a quadrangular outer peripheral surface and has a dimension sufficient not to project or almost not to project the release arms 61 outwardly from the pipe entrance portion 37. And, the arcuate projecting portion 31 also provided with a flat portion corresponding to the inner surface 69 of the connecting portion 35 on an inner surface thereof at a connecting region to the connecting portion 35.

In the pipe entrance portion 37, an outer peripheral surface of a portion connected to the connecting portion 33 is flush with an outer surface of the connecting portion 33. In a gap defined between the connecting portion 33 and the pipe support portion 11 and with a bottom surface defined by an outer surface of the arcuate projecting portion 29, for example, a pull-tab checker is fitted. The pull-tab checker has, for example, an engaging leg portion adapted to follow the arcuate protruding portion 29, and a verifying engaging portion on a leading end of the engaging leg portion, adapted to engage with an end portion of the arcuate projecting portion 29.

The entrance hole 67 of the pipe entrance portion 37 is formed with the recessed portion 44 of a quadrangular cross-section (square or rectangular cross-section) at a position of the connecting portion 33. The recessed portion 44 extends into the connecting portion 33 and terminates at one axial end portion of the connecting portion 33. An inner surface of the connecting portion 33 is curved so as to define an arcuate or circular inner surface common with inner surfaces of the fixing end portions 41 of the retainers 5 and the entrance hole 67, and the recessed portion 44 extends in one axial direction along a circumferential center or a widthwise center of the inner surface of the connecting portion 33. The recessed portion 44 has an identical cross-sectional shape through its entire length.

Thus constructed quick connector 1 is constructed by fitting together a tube-end component member 77 comprising the tube connecting portion 7, the curved portion 13 and a portion 75 composing the pipe support portion 11 (herein after referred to as a pipe support composing portion 75, a plug-in portion), and a retainer-end composing member 81 comprising the pipe retainer portion 9 and a portion 79 composing a leading end of the pipe support portion 11 (herein after referred to as a leading end composing portion 79, fit portion). In the retainer-end composing member 81, the leading-end composing portion 79 integrally comprises an annular portion 83 with a narrow width in a radial direction, an inner cylindrical portion 85 slightly protruding in one axial direction from a radially inside of a one axial end surface of the annular portion 83, and a plurality of fixing segments 89 extending long from a radially outside of the one axial end surface of the annular portion 83, in one axial direction. Each of the fixing segments 89 is formed with an engaging hole 87. The fixing segments 89 have arcuate cross sections, and are arranged equally spaced in a circumferential direction from each other, so as to form an annular shape or a cylindrical shape. And, the tube-end composing member 77 has a large diameter portion 93 in an inner periphery of the other axial end portion 91 and an engaging detent 95 on an outer periphery thereof. The O-ring 27 (annular sealing member) is fitted in the large diameter portion 93 of the tube-end composing member 77, the other axial end portion 91 or the pipe support composing portion 75 of the tube-end composing member 77 is inserted relatively between the inner cylindrical portion 85 and the fixing segments 89 of the retainer-end composing member 81 to engage the engaging detents 95 of the tube-end composing member 77 in the engaging holes 87 of the fixing segments 89, and thereby the quick connector 1 is completed. Here, the other axial end surface of the annular portion 83 of the retainer-end composing member 81 defines the other axial end surface of the pipe support portion 11, while the inner cylindrical portion 85 of the retainer-end composing member 81 and the large diameter portion 93 of the tube-end composing member 77 define the annular groove 25.

Figure 5:
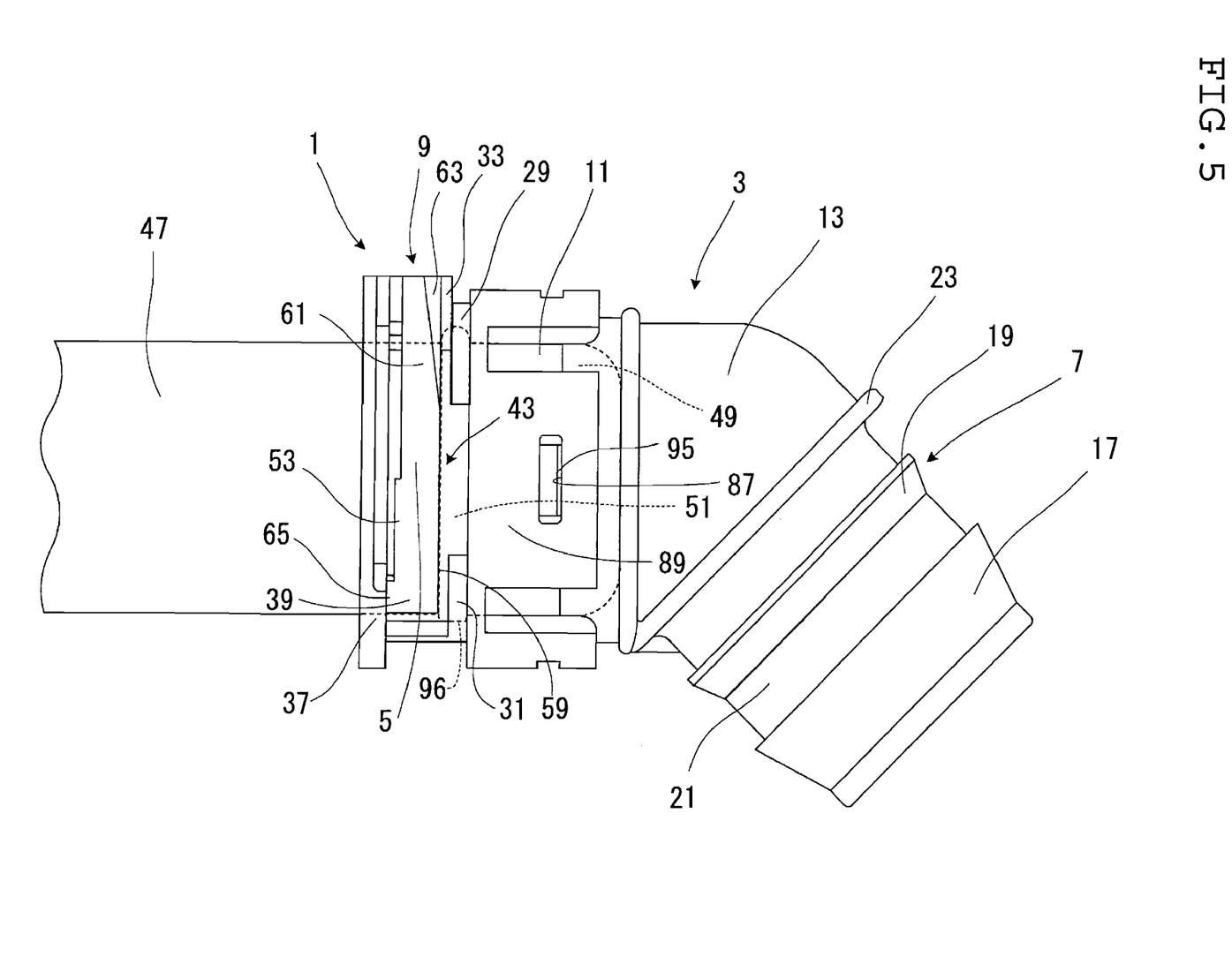
FIG. 5 is a view showing a state that a pipe is inserted and connected to the quick connector of FIG. 1.
Figure 6:
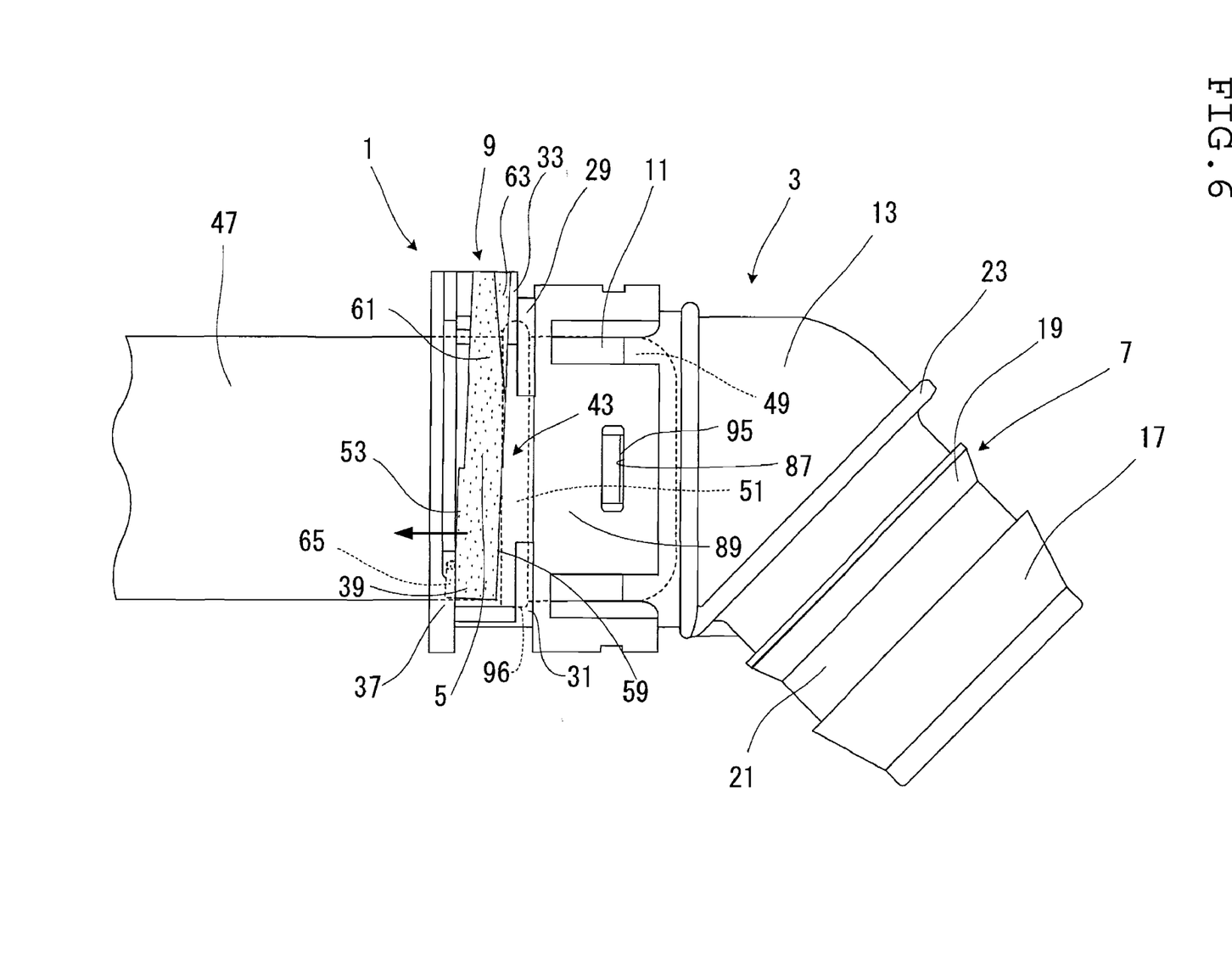
FIG. 6 is an explanatory view for explaining a case that a separating force acts between the pipe and the quick connector in FIG. 5.
Figure 7:
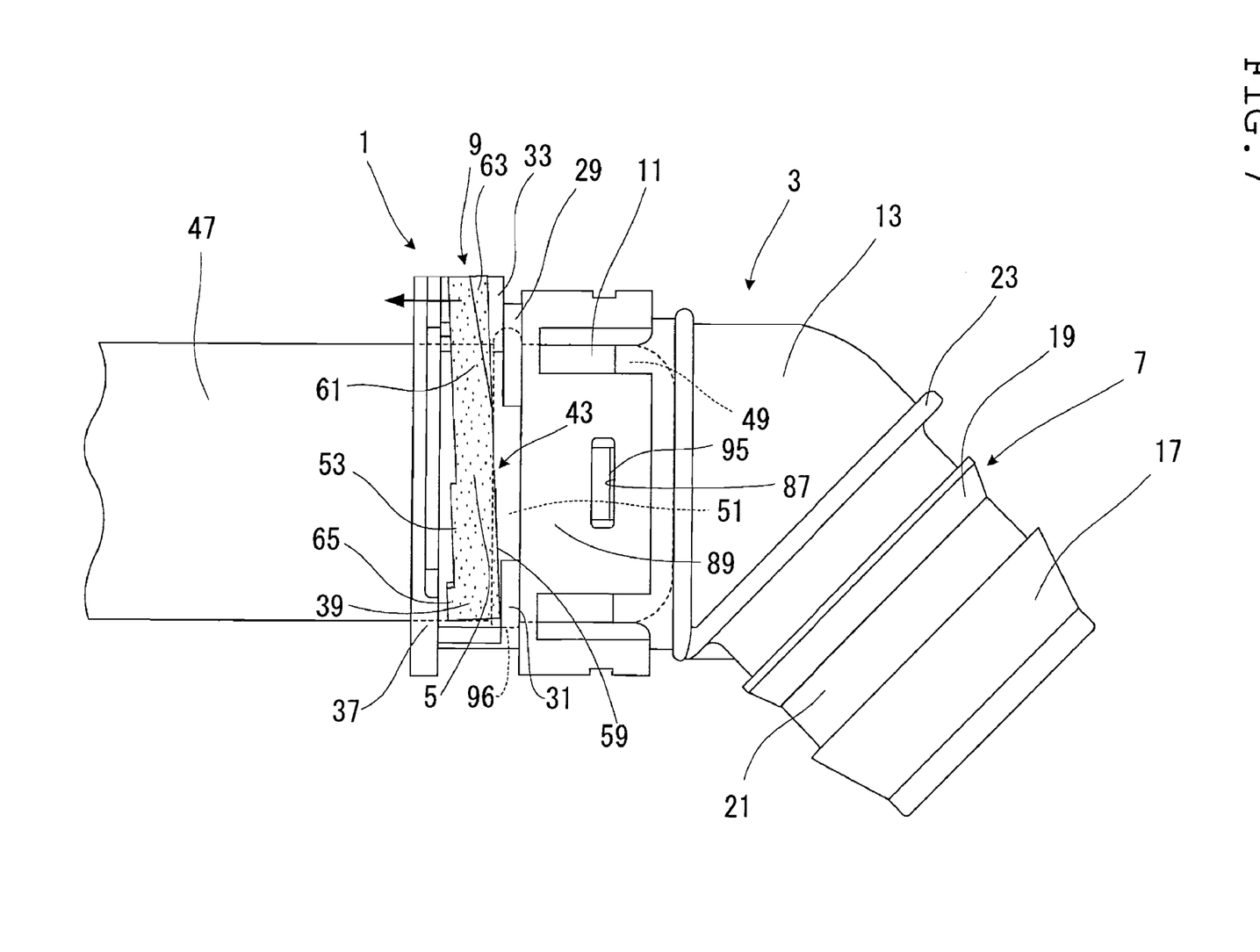
FIG. 7 is a view for explaining that the pipe is removed from the quick connector in FIG. 5.

With reference to FIGS. 5 to 7, a function of the quick connector 1 will be explained.

The insertion end portion 49 of the pipe 47 is inserted in the connector housing 3 through the entrance hole 67 of the pipe entrance portion 37, and the annular engaging projection 51 of the insertion end portion 49 abuts the inner surface 55 of the engaging portion 53 of the retainer 5. Since the inner surface 55 of the engaging portion 53 extends in one axial direction at an angle toward a radially inward direction, the inner surface 55 is gradually pushed and displaced radially outwardly as the annular engaging projection 51 advances, the retainers 5 are resiliently deformed so as to spread apart with the fixing end portions 41 (portion continued to circumferential end portions of the fixing portion) as center of rotation or taking the fixing end portions 41 as fulcrums, respectively, and the engaging portions 53 are moved radially outwardly. And, when the insertion end portion 49 of the pipe 47 is inserted in the connector housing 3 until the annular engaging projection 51 passes through the engaging portions 53, the retainers 5, 5 resiliently return to their initial closed positions to snap-engage with the annular engaging projection 51. Then, the annular engaging projection 51 is held between the one axial end surfaces 59 of the engaging portions 53 of the retainers 5 and the other axial end surface of the pipe support portion 11, and axially positioned. In this manner, the pipe 47 is connected to the connector housing 3 in locked relation. Meanwhile, the annular engaging projection 51 includes a flat portion or flat surface portion 96 (also refer to FIG. 11) corresponding to the inner surface 69 of the connecting portion 35 and the flat surface portion 71, and the pipe 47 is inserted in the connector housing 3 in such manner that the flat surface portion 96 of the annular engaging projection 51 conforms to the inner surface 69 of the connecting portion 35 and the flat surface portion 71.

At that time, when a detachment force or separating force in a direction of withdrawal from the connector housing 3 acts on the pipe 47, the retainers 5 are pushed relatively by the annular engaging projection 51, and deformed in the other axial direction with respect to the connector housing 3 (refer to an arrow in FIG. 6). When the retainers 5 are deformed in the other axial direction, the anti-spreading protruding portions 65 of the engaging portions 53 of the retainers 5 immediately enter in the receiving recessed portions 73 of the entrance hole 67. When the anti-spreading protruding portions 65 enter in the receiving recessed portions 73, inner surfaces of the receiving recessed portions 73 restrain the anti-spreading protruding portions 65, therefore the retainers 5 from being deformed and spreading radially outwardly. So, even when a strong detachment force acts on the pipe 47, the pipe 47 is not dislodged from the retainers 5.

In order to detach the pipe 47 from the connector housing 3, a distance between leading end portions of the release arms 61 are narrowed to deform the retainers 5 so as to spread apart with the fixing end portions 41 as center of rotation or taking the fixing end portions 41 as fulcrums, by pinching the release arms 61 radially inward from outside. When the retainers 5, 5 are deformed so as to spread apart until the engaging portions 53 are deformed and moved radially outward from the annular engaging projection 51, the pipe 47 can be pulled out relatively from the connector housing 3. When the release arms 61 are pressed inwardly with fingers, pressure is exerted with the fingers also on the slant surfaces 63. At that time, pressure component force acts on the slant surfaces 63 by the fingers in the other axial direction, thereby the release arms 61 are deformed in the other axial direction (refer to an arrow in FIG. 7). When the release arms 61 are deformed in the other axial direction, the retainers 5 are deformed in one axial direction with the fixing end portions 41 as center of rotation or taking the fixing end portions 41 as fulcrums (refer to FIG. 7). It is effectively prevented in this manner that the anti-spreading protruding portions 65 of the retainers 5 enter in the receiving recessed portions 73 of the entrance hole 67 and the retainers 5 cannot be spread apart by pressing the release arms 61 inwardly. Meanwhile, a beginning or beginning edge of the slant surface 63 is located at an axial center portion of a radially outer surface on a leading end or a leading edge of the release arm 61. If the beginning or beginning edge of the slant surface 63 is located on the other axial end with respect to the axial center portion of the radially outer surface on the leading end or the leading edge of the release arm 61, a worker has difficulty to press the release arms 61. Or, if the beginning or beginning edge of the slant surface 63 is located on one axial end with respect to the axial center portion of the radially outer surface on the leading end or the leading edge of the release arm 61, a force for pushing the release arms 61 in the other axial direction is weakened. Here, the axial center portion of the radially outer surface means a region of the radially outer surface between a position displaced by 10% of the axial length of the radially outer surface in one axial direction with respect to an axial center thereof, and a position displaced by 10% of the axial length of the radially outer surface in the other axial direction with respect to the axial center thereof.

Figure 8:
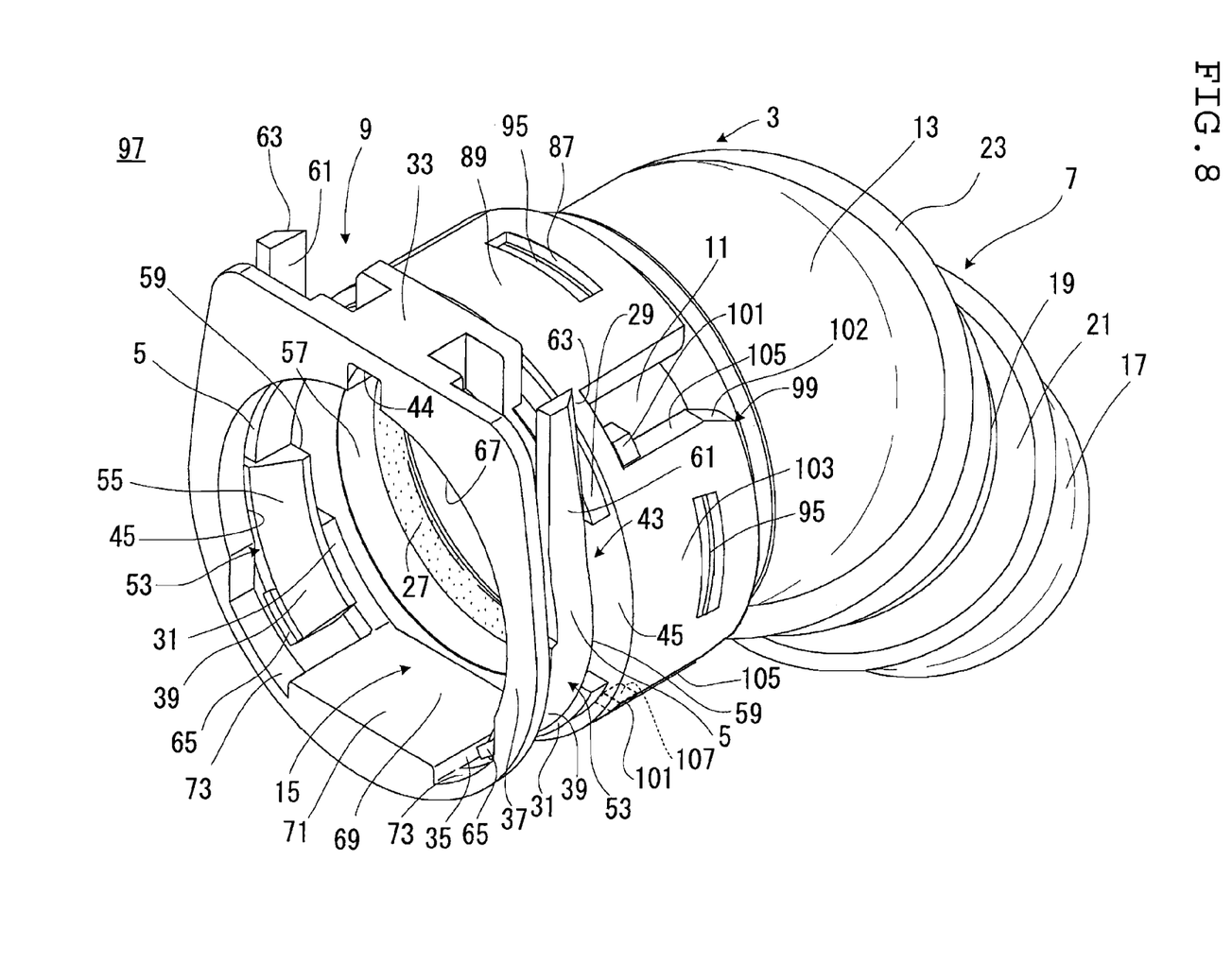
FIG. 8 is a perspective view of a modified embodiment of the quick connector.
Figure 9:
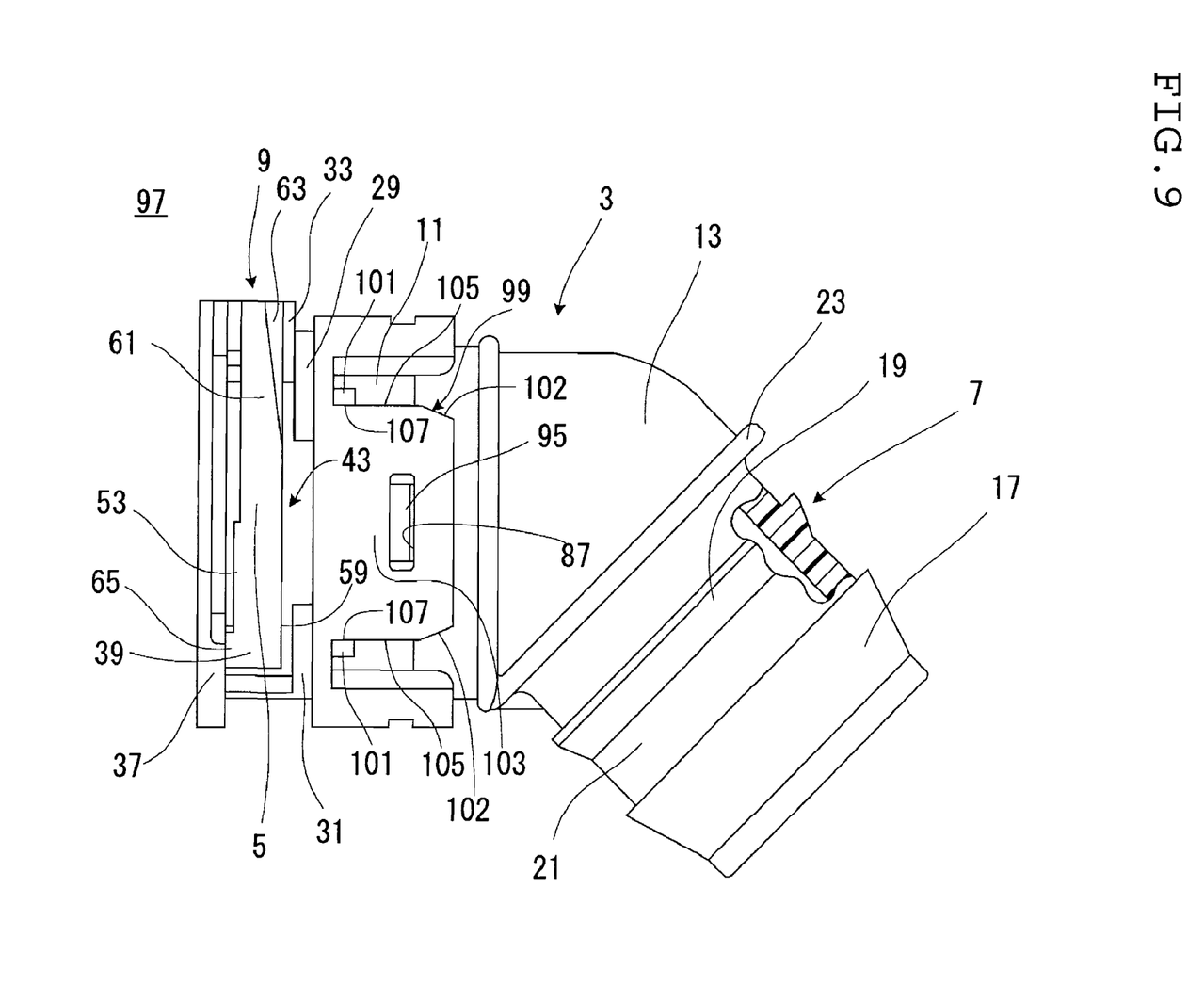
FIG. 9 is a front plan view of the quick connector of FIG. 8.
Figure 10:
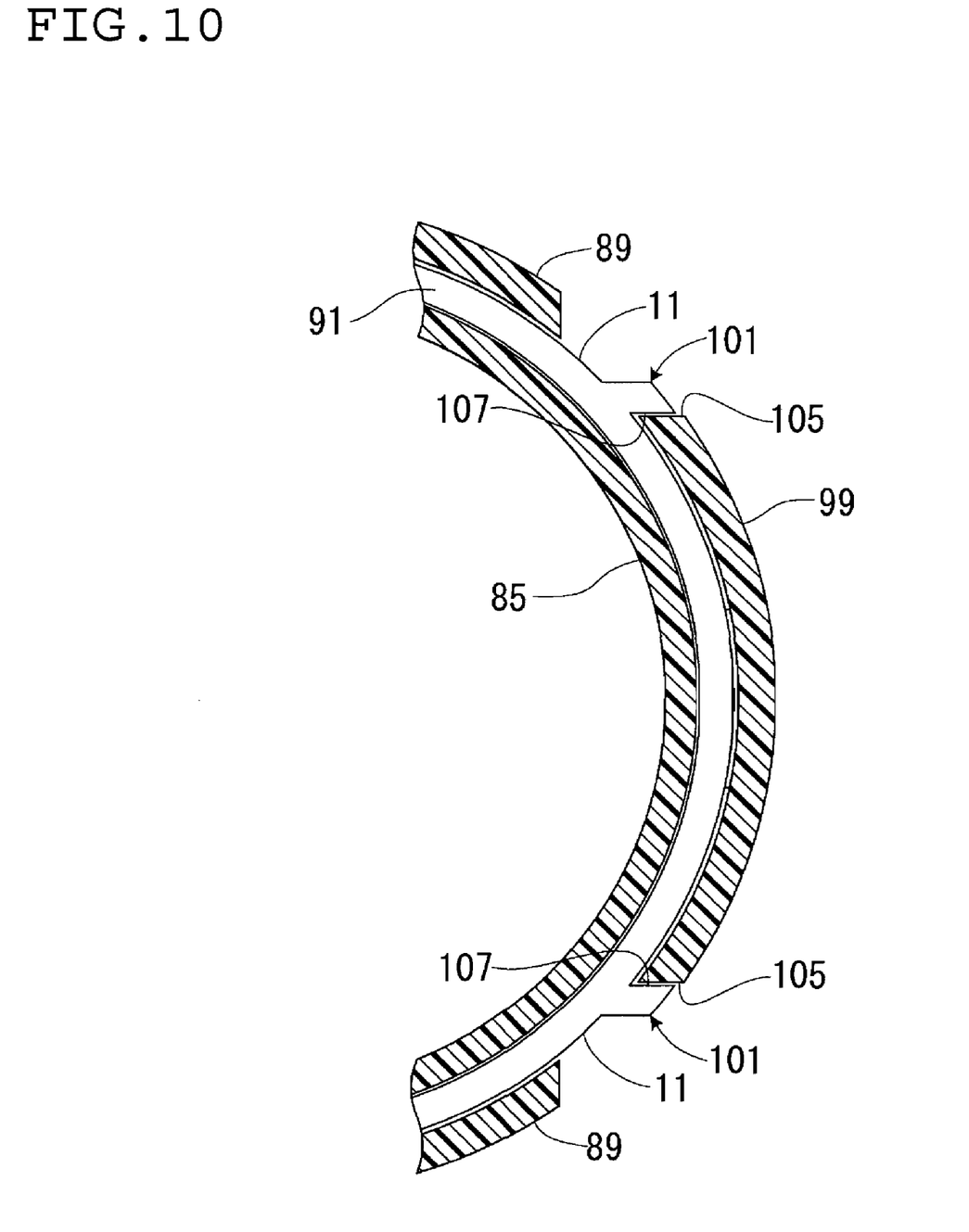
FIG. 10 is a sectional view showing a pair of anti-rotating projecting portions.

With reference to FIGS. 8 to 10, a quick connector 97 that is configured by modifying the quick connector 1 will be explained.

In a quick connector 97, one of the fixing segments 89 of the retainer-end composing member 81 is modified in shape, and the pipe support composing portion 75 of the tube-end composing member 77 is modified in configuration. Other configuration is the same as that of the quick connector 1. Elements identical to those of the quick connector 1 are indicated with identical reference numbers and a redundant explanation of elements already discussed are omitted.

The pipe support composing portion 75 of the tube-end composing member 77 is formed integrally with a pair of anti-rotation detents 101, 101 (anti-rotation projecting portions) on an outer peripheral surface thereof so as to conform to a fixing segment 99 that is disposed on a circumferential position corresponding to one of the retainers 5. Each of the anti-rotation detents 101 has a square cross-section. This fixing segment 99 has the same shape as other fixing segments 89 except that a leading end portion thereof is tapered, namely, both side surfaces 102, 102 of the leading end portion extend in one axial direction at angle toward a widthwise center (a circumferential center) of the fixing segment 99. Both side surfaces 105, 105 of a rectangular body portion 103 of the fixing segment 99 (a portion except for the tapered leading end portion) extend or spread parallel to a plane extending through a central axis of the pipe support portion 11 and a circumferential center line of the fixing segment 99. A distance or a circumferential distance between the pair of the anti-rotation detents 101 (a distance or a circumferential distance between circumferentially inner surfaces 107 of the pair of the anti-rotation detents 101) is set equal to a width of the body portion 103 of the fixing segment 99, namely, a distance or a circumferential distance between the both side surfaces 105 of the body portion 103. Radial outer surfaces of the anti-rotation detents 101 are formed so as to be included in a circumferential surface or cylindrical surface including a radial outer surface of the fixing segment 99. Meantime, all fixing segments 89, 99 may have tapered leading end portions.

Here, the retainer-end composing member 81 and the tube-end composing member 77 are fitted to each other in such manner that the fixing segment 99 are inserted and located between the pair of the anti-rotation detents 101. The anti-rotation detents or anti-rotation projecting portions 101 are located on root corners of the body portion 103 of the fixing segment 99, respectively. Therefore, the fixing segment 99 (the retainer-end composing member 81) is accurately locked against rotational movement by the pair of the anti-rotation detents 101 that are in surface-to-surface contact with the both side surfaces 105. So, in order to improve fit characteristics (easiness of assembling), even if the engaging detent 95 is fitted in the engaging hole 87 with large circumferential play, a large circumferential play is not created between the retainer-end composing member 81 and the tube-end composing member 77.

Figure 11:
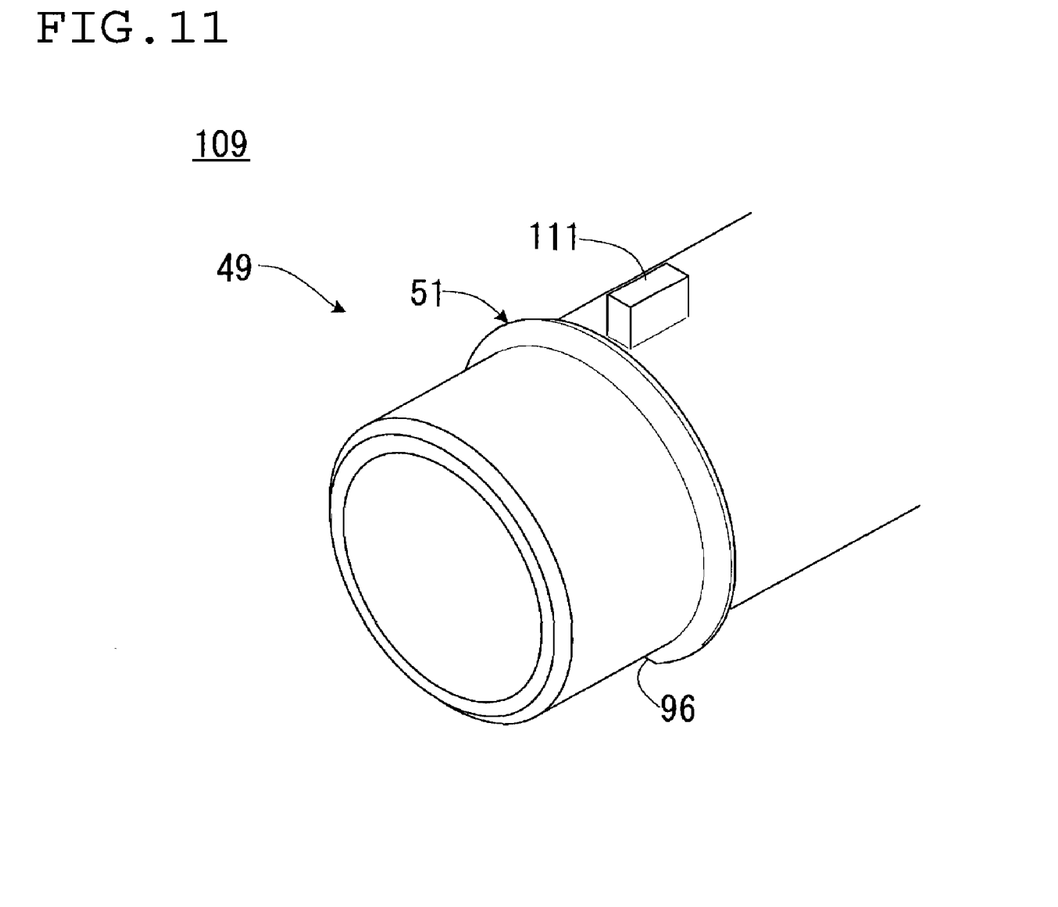
FIG. 11 is a perspective view showing a modified embodiment of the pipe.
Figure 12:
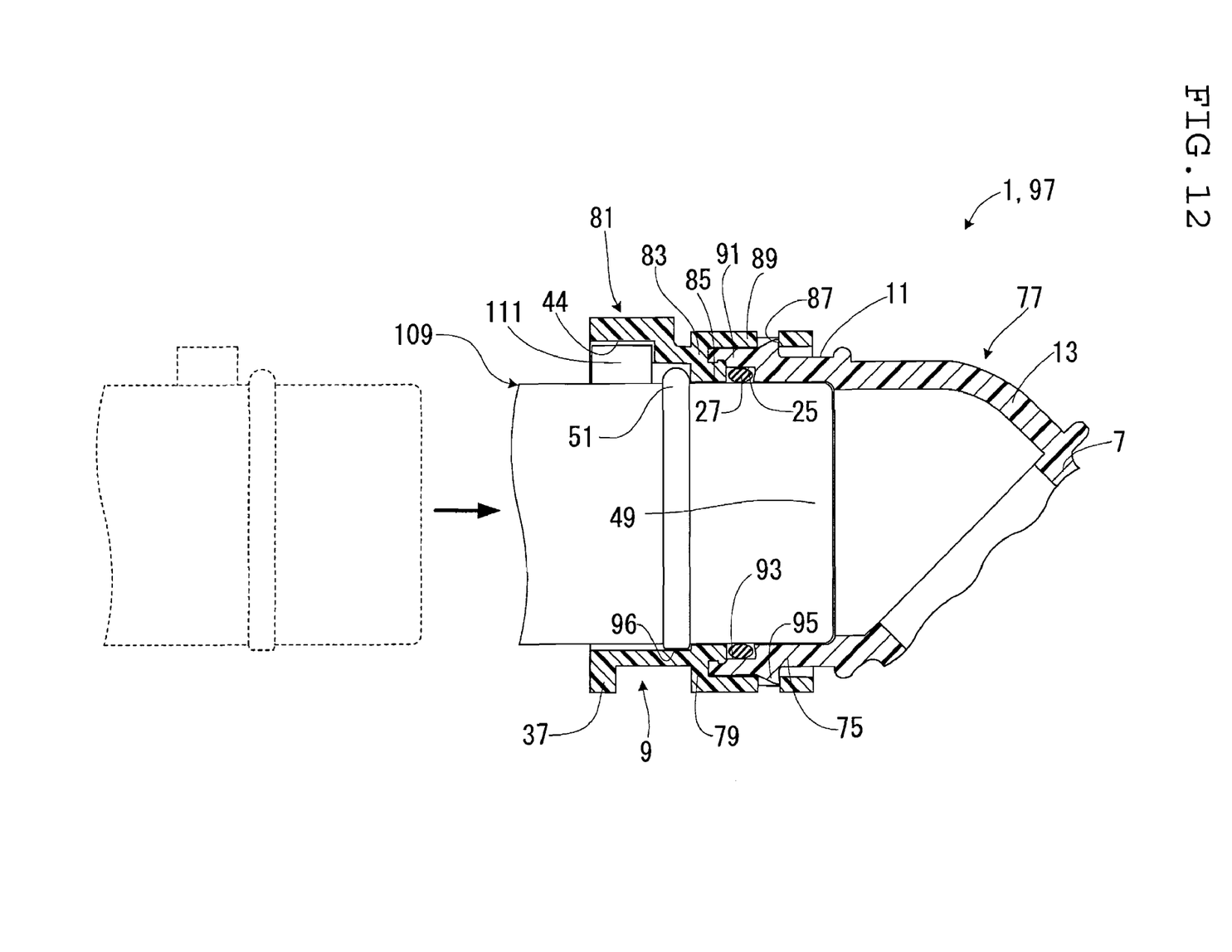
FIG. 12 is a view showing a state that the pipe of FIG. 11 is inserted in and connected to the quick connector of FIG. 8.

With reference to FIGS. 11 and 12, a configuration of another type of a pipe that is adapted for the quick connector 1, 97 will be explained.

A pipe 109 is formed with an anti-rotation stay 111 on an outer periphery of an insertion end portion 49 thereof, axially rearward from the annular engaging projection 51 (axially opposite to a leading end portion with respect to the annular engaging projection 51 or on the other axial end of the pipe 109 with respect to the annular engaging projection 51) and diametrically opposite to the flat portion or flat surface portion 96. The anti-rotation stay 111 project in a radially outwardly greater than the annular engaging projection 51. The rest of the configuration of the pipe 109 is identical to that of the pipe 47. The anti-rotation stay 111 has a rectangular cross-section, and securely fixed to the insertion end portion 49, for example, by welding. A portion of the anti-rotation stay 111 extending radially outward with respect to the annular engaging projection 51 has a cross-sectional shape identical to, generally identical to, or corresponding to that of the recessed portion 44 of the pipe retainer portion 9, and has an axial length identical to or generally identical to that of the recessed portion 44. And, while the pipe 109 has been inserted in the connector housing 1, 97, for example, in such manner that the flat surface portion 96 conforms to or corresponds to the connecting portion 35 in a circumferential position (in this state, the anti-rotation stay 111 conforms to or corresponds to the recessed portion 44 in a circumferential position), the anti-rotation stay 111 enters or seats in the recessed portion 44 without or generally without creating a circumferential space, not protruding in the other axial direction out of the recessed portion 44, whereby an highly accurate anti-rotation lock is ensured for preventing rotational movement between the pipe 109 and the quick connector 1, 97 or the pipe retainer portion 9.

With use of the quick connector according to the present invention, a pipe is prevented from being removed accidentally out of the quick connector during operation, and a pipe can be smoothly detached from the quick connector even when the quick connector and the pipe are applied in a region such as an engine room of a motor vehicle where parts and components are densely arranged.

What is claimed is:

1. A quick connector, comprising:
    a tubular connector housing provided with a tube connecting portion on one longitudinal end thereof and a pipe retainer portion on the other longitudinal end thereof,
    retainer means arranged in the pipe retainer portion, and adapted for snap-engaging with an annular engaging projection formed on an insertion end portion of a pipe that is inserted in the connector housing and thereby locking the pipe with respect to the connector housing, the retainer means having a pair of retainers disposed on diametrically opposite sides of a passageway of the annular engaging projection, and release arms provided on the retainers, respectively, the retainer means being formed so as to follow a plane perpendicular to an axis of the pipe retainer portion,
    each of the retainers having a fixing end portion integrally connected to and supported by the pipe retainer portion, and a free end provided with an engaging portion for snap-engaging with the annular engaging projection, the retainers being resiliently deformable in such manner that the free ends spread out with the fixing end portions as center of rotation by pressing the pair of release arms radially inwardly,
    the free ends of the retainers being adapted for engaging with an inner surface of the pipe retainer portion of the connector housing when being deformed in a direction of the other longitudinal end, so that the free ends are restrained from spreading radially outwardly when being pressed in the direction of the other longitudinal end,
    wherein:
    the release arms are parallel to each other and radially spaced apart from each other along a plane perpendicular to the axis of the pipe retainer portion,
    wherein;
    each of the release arms has a cross-sectional shape for exerting a pressure on the release arm in the direction of the other longitudinal end when being pressed radially inwardly from outside.

2. The quick connector as set forth in claim 1, wherein each of the release arms has a cross-sectional shape of which peripheral edge includes a radially outer portion extending at an angle inclined radially inward in one longitudinal direction when taken at a plane perpendicular to an extending direction of the release arm.

3. The quick connector as set forth in claim 1, wherein the pipe retainer portion of the connector housing is formed with retainer locating slits extending in a circumferential direction, and the retainers are disposed in the retainer locating slits, respectively.

4. The quick connector as set forth in claim 3, wherein the engaging portion of the retainer has an anti-spreading protruding portion protruding in the direction of the other longitudinal end, the pipe retainer portion has a receiving recessed portion in an inner surface thereof on the other longitudinal end with respect to the retainer locating slit, wherein;
when the free end of the retainer is deformed in the direction of the other longitudinal end, the anti-spreading protruding portion enters into and engages with the receiving recessed portion to restrain the free end from spreading radially outwardly.

5. The quick connector as set forth in claim 3, wherein the pipe retainer portion has a pipe entrance portion on the other longitudinal end with respect to the retainer locating slit, the pipe entrance portion having a plate-like portion of a quadrangular shape near the release arms.

6. The quick connector as set forth in claim 5, wherein the pipe entrance portion further has a semi-circular outer peripheral surface near the free ends of the retainers.

7. The quick connector as set forth in claim 1, wherein the connector housing comprises a tube-end composing member having the tube connecting portion, and a retainer-end composing member having the pipe retainer portion that is fitted to the tube-end composing member, either one of the tube-end composing member and the retainer-end composing member is formed with a fit portion that has a plurality of fixing segments arranged circumferentially and formed with engaging holes therein, and the other of the tube-end composing member and the retainer-end composing member has a plug-in portion that has engaging detents on an outer periphery thereof, the tube-end composing member and the retainer-end composing member are fit to each other in such manner that the plug-in portion is inserted inside or under the fixing segments in the fit portion so as to engage the engaging detents with the engaging holes, the plug-in portion further has a pair of anti-rotation projecting portions on the outer periphery thereof, the pair of anti-rotation projecting portions are spaced apart by a distance equal to or generally equal to a width of the fixing segment, the fixing segment is positioned between the pair of the anti-rotation projecting portions without or generally without creating a space circumferentially when the plug-in portion is inserted in the fit portion.

8. The quick connector as set forth in claim 7, wherein the fit portion has an inner cylindrical portion radially inside the fixing segments, and the plug-in portion is inserted between the fixing segments and the inner cylindrical portion of the fit portion.

9. The quick connector as set forth in claim 8, wherein the pair of the anti-rotation projecting portions (101) are provided for exactly one of the fixing segments (99).

10. The quick connector as set forth in claim 9, wherein said one of the fixing segments has a shape tapered toward a leading end thereof on a leading end portion thereof.

11. The quick connector as set forth in claim 1, wherein an entrance hole of a pipe entrance portion of the pipe retainer portion is provided with a recessed portion.

12. The quick connector as set forth in claim 11, wherein the recessed portion serves as anti-rotation lock with respect to the pipe.

13. The quick connector as set forth in claim 12, wherein the recessed portion receives an anti-rotation stay formed on the insertion end portion of the pipe and inserted therein while the pipe being inserted in the connector housing, and engages with the anti-rotation stay in anti-rotation relation.

14. The quick connector as set forth in claim 1, wherein the release arms extend in a radial direction, respectively.

* * * * *